United States Patent
Thomas et al.

(10) Patent No.: US 7,211,128 B2
(45) Date of Patent: May 1, 2007

(54) METHOD OF PURIFYING A NATURAL GAS BY MERCAPTAN ADSORPTION

(75) Inventors: Michel Thomas, Rueil Malmaison (FR); Eszter Toth, Lyons (FR); Fabrice Lecomte, Paris (FR); Géraldine Laborie, Courvevoie (FR); Chantal Rigaill, Yerres (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 378 days.

(21) Appl. No.: 10/973,294

(22) Filed: Oct. 27, 2004

(65) Prior Publication Data

US 2005/0109206 A1 May 26, 2005

(30) Foreign Application Priority Data

Oct. 27, 2003 (FR) .................................. 03 12557

(51) Int. Cl.
*B01D 53/04* (2006.01)
(52) U.S. Cl. ............................. 95/135; 95/148; 95/235; 208/208 R
(58) Field of Classification Search ............... 95/90, 95/114, 115, 135, 148, 149, 235; 423/242.1, 423/244.01; 208/189, 208 R, 250
See application file for complete search history.

(56) References Cited

U.S. PATENT DOCUMENTS

| 4,830,733 | A | * | 5/1989 | Nagji et al. ............. 208/208 R |
| 4,957,715 | A | * | 9/1990 | Grover et al. ............... 423/228 |
| 5,659,109 | A | * | 8/1997 | Fernandez de la Vega et al. ........................... 585/834 |
| 5,746,807 | A | * | 5/1998 | Thelen et al. .................. 95/123 |
| 6,743,405 | B1 | * | 6/2004 | Siriwardane ........... 423/244.06 |

* cited by examiner

*Primary Examiner*—Frank M. Lawrence
(74) *Attorney, Agent, or Firm*—Antonelli, Terry, Stout & Kraus, LLP.

(57) ABSTRACT

The raw natural gas is pretreated in treating unit 30. The treated gas is then purified by adsorption of the mercaptans in first enclosure 31. The various cuts that make up the purified gas are separated in fractionating unit 34. Part of the methane making up the purified gas is saturated with a C5+ hydrocarbon in contactor 33, then it is fed into second enclosure 32 so as to regenerate the adsorbent material contained in this second enclosure. The gas from the second enclosure is washed in unit 35, then recycled.

11 Claims, 2 Drawing Sheets

METHOD OF PURIFYING A NATURAL GAS BY MERCAPTAN ADSORPTION

FIELD OF THE INVENTION

The present invention relates to purification of a natural gas. More particularly, the present invention provides a purification method using adsorption of a natural gas in order to reduce the mercaptan content.

BACKGROUND OF THE INVENTION

A raw natural gas containing water, heavy hydrocarbons, acid compounds such as carbon dioxide ($CO_2$) and hydrogen sulfide ($H_2S$), and sulfur derivatives such as mercaptans, can be treated by means of the methods described by documents FR-2,605,241 and FR-2,636,857. These methods use a physical solvent such as methanol for dehydration, gasoline extraction and removal of the acid compounds and of the mercaptans. After this treatment, the gas meets the requirements as regards the $CO_2$ content, typically below 2% by mole, and the $H_2S$ content, typically 4 ppm by mole.

Another gas treatment solution consists in carrying out deacidizing by means of a method using an amine solvent. Part of the light mercaptans, notably methylmercaptan, is removed during this stage. The heavier mercaptans, such as ethyl-, propyl- and butyl-mercaptan, are not sufficiently acid to significantly react with the amines and therefore remain in the gas in a large proportion.

The gas is then dehydrated by means of a method using a solvent such as glycol, for example the method described by document FR-2,740,468. Dehydration allows the water content of the gas to be lowered to a value close to 60 ppm by mole.

Besides, a TSA (Thermal Swing Adsorption) type adsorption method on a molecular sieve, for example of 3, 4A or 13X type, or on silica gel or alumina, can be used. In this case, the water content of the gas is typically below 1 ppm by mole.

The aforementioned methods allow to obtain a natural gas whose water, acid compound and heavy hydrocarbon contents in the natural gas treated meet the commercial requirements. However, the methyl- and ethyl-mercaptans still remain predominantly in the gas, in proportions that can reach 200 ppm or more in sulfur equivalent. For certain uses, these mercaptan proportions are too high.

One object of the present invention is to provide a natural gas purification method in order to obtain a mercaptan molar content below 10 ppm in sulfur equivalent.

It is possible to use a removal method using mercaptan adsorption. The conventional gas phase adsorption methods are the methods commonly referred to as TSA (Thermal Swing Adsorption) wherein the adsorption stage takes place at ambient or moderate temperature typically ranging between 200° C. and 350° C., in a purge gas sweep stream (in general part of the purified gas) whose flow rate ranges between 5% and 20% of the flow rate of the feed gas. The desorption gas containing a large amount of mercaptans then has to be treated prior to being recycled, for example by treatment with a basic solution (soda or potash), or it can be sent to the flare, which is neither economically nor ecologically advantageous. The pressure is either kept substantially constant throughout the cycle, or lowered during the regeneration stage so as to favour regeneration. After this stage of purification by adsorption, the water content of the gas is below 1 ppm by mole, and the gas meets the total sulfur requirements.

However, adsorption of the mercaptans by means of a conventional TSA method used in the industry, and notably to purify a natural gas, has several drawbacks. The following can be mentioned in particular:

long cycle times, in general rarely less than 4 hours, more often ranging between 8 and 12 hours, sometimes more, because of the thermal inertia of the adsorbent material, immobilization of the adsorbent material because of the long cycle times, only the material transfer zone consisting of the adsorption fronts of the various compounds in the adsorber being really used, for adsorption as well as for regeneration, necessity to heat to high temperatures, which leads to premature aging of the adsorbent material, notably during the desorption of thermally fragile products (under the effect of the thermal treatments regularly applied during the adsorbent material regeneration stage, the mercaptans can form reactive compounds and react with the co-adsorbed hydrocarbons so as to eventually lead to premature aging of the adsorbent material, which may require frequent renewal thereof, and thus an additional cost), use of a large amount of purge gas, generally ranging between 5% and 20% of the flow rate of gas to be treated, necessity to treat the purge gas containing the desorbed products and to recycle the purge gas.

The present invention provides a method of purifying a natural gas by mercaptan adsorption, avoiding the drawbacks of the methods from the prior art.

SUMMARY OF THE INVENTION

The present invention relates to a method of purifying a natural gas containing mercaptans. The method comprises the following stages:

a) purifying said gas by contacting with a first amount of adsorbent material, b) mixing part of the purified gas obtained in stage a) with a liquid hydrocarbon phase comprising more than five carbon atoms, c) contacting the mixture obtained in stage b) with a second amount of adsorbent material laden with mercaptans.

The operating conditions of the method according to the invention can be as follows:

stage a) is carried out at a pressure ranging between 2 MPa and 10 MPa, and at a temperature ranging between −40° C. and 100° C., in stage b), said part of the purified gas makes up between 1% and 50% of said natural gas, stage b) is carried out at a pressure ranging between 0.5 MPa and 10 MPa, and at a temperature ranging between 0° C. and 150° C. so that the relative pressure of said hydrocarbons in said part of the purified gas is less than 1, stage c) is carried out at a pressure ranging between 1 MPa and 10 MPa, and at a temperature ranging between 0° C. and 150° C.

In the method according to the invention, after a predetermined time, in stage a), said natural gas can be purified by contacting with the second amount of adsorbent material and, in stage c), the mixture obtained in stage b) can be contacted with the first amount of adsorbent material. Before stage a), the amounts of $CO_2$, $H_2S$ and water contained in the natural gas can be reduced.

According to the invention, the natural gas can comprise hydrocarbons having at least five carbon atoms and, before stage a), a fraction of said natural gas can be separated, the fraction comprising hydrocarbons having at least five carbon atoms and, finally, said liquid phase of stage b) can comprise said fraction.

According to the invention, the natural gas can comprise hydrocarbons having at least five carbon atoms and a fraction of the purified gas obtained in stage a) can be separated, the fraction comprising hydrocarbons having at least five carbon atoms and, finally, wherein said liquid phase of stage b) can comprise said fraction.

According to the invention, before stage a), the natural gas can be dehydrated by contacting the natural gas with a third amount of adsorbent material. Furthermore, the mercaptan-laden gas obtained in stage c) can be washed with a mercaptan-absorbent solution, then the washed gas can be recycled.

According to the invention, the adsorbent material making up said first and second amounts can comprise at least one of the following materials: a zeolite, an activated charcoal, an activated alumina type mesoporous adsorbent, and a silica gel type mesoporous adsorbent.

More precisely, the adsorbent material making up said first and second amounts can comprise at least one of the following materials: a type A zeolite, a faujasite X type zeolite, a faujasite Y type zeolite, an activated charcoal having a BET specific surface area ranging between 200 $m^2/g$ and 2000 $m^2/g$, an activated alumina type mesoporous adsorbent having a BET specific surface area ranging between 100 $m^2/g$ and 800 $m^2/g$, and a silica gel type mesoporous adsorbent having a BET specific surface area ranging between 100 $m^2/g$ and 800 $m^2/g$.

According to the invention, the hydrocarbons containing more than five carbon atoms can comprise at least one of the following compounds: a saturated hydrocarbon, an aromatic hydrocarbon, a paraffin and a naphthene.

The stage of adsorption under pressure and at ambient or moderate temperature and the stage of displacement of the adsorbed mercaptans by a displacement agent, at ambient or moderate temperature, allows to reduce the cycle times, the amount of adsorbent material required and the purge gas flow rate, and to increase the life of the adsorbent material.

BRIEF DESCRIPTION OF THE FIGURES

Other features and advantages of the invention will be clear from reading the description hereafter, given by way of non limitative example, with reference to the accompanying drawings wherein.

DETAILED DESCRIPTION

Figure 1:
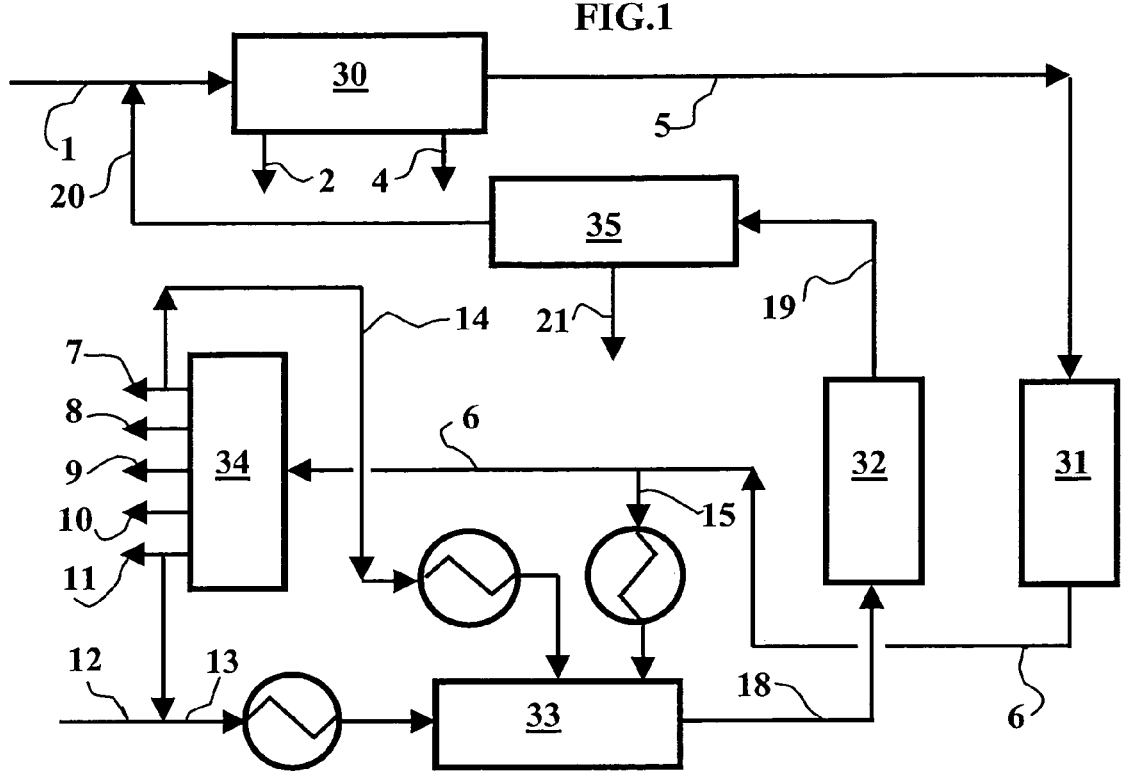
FIG. 1 describes a first method which is an embodiment example according to the invention.
Figure 2:
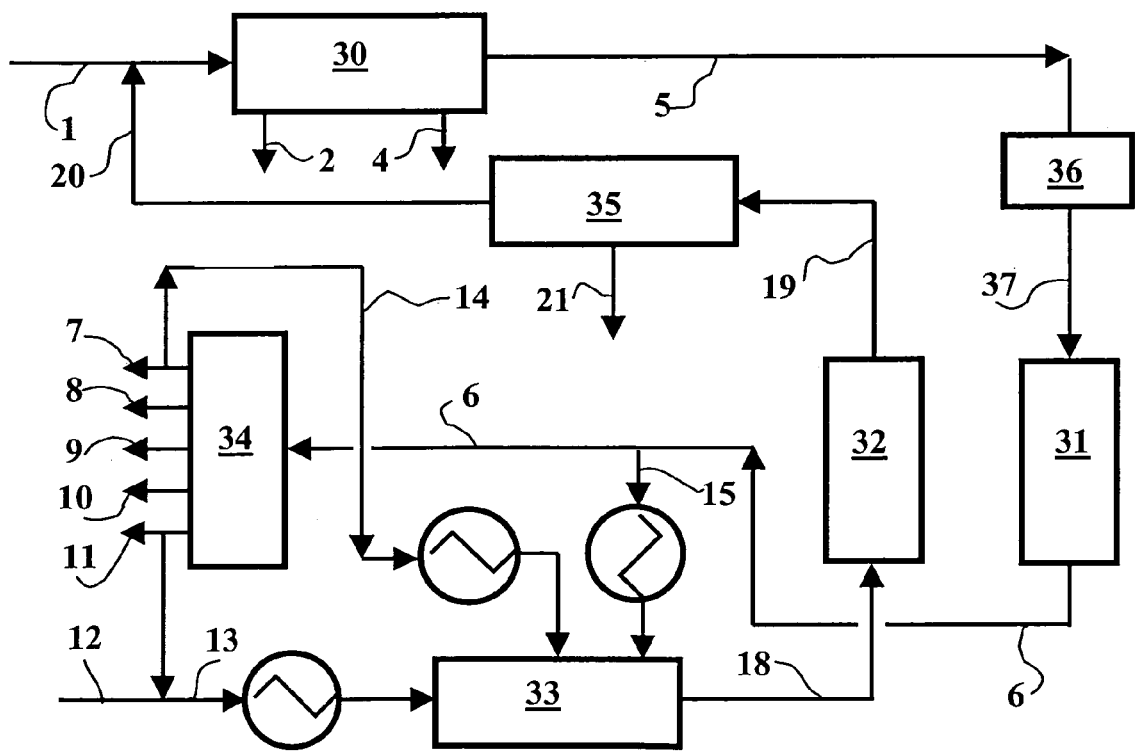
FIG. 2 shows a variant of the method according to the invention, FIG. 3 diagrammatically shows a second example of implementation of the invention.

The method described in connection with FIGS. 1 and 2 comprises a pretreatment, possibly dehydration, adsorption, fractionation, regeneration and possibly washing.

1) Pretreatment

The natural gas containing notably water, $CO_2$, $H_2S$ and mercaptans, and flowing in through line 1, is deacidized and dehydrated in treating unit 30. The gas can be a raw natural gas directly coming from an oilwell or from a gas field.

In unit 30, the gas is treated by means of methods known to the man skilled in the art. For example, the gas is treated by means of a method using chemical and/or physical solvents, for example based on amines and/or methanol, so as to produce a natural gas meeting the $CO_2$ and $H_2S$ content requirements. Such methods are notably described by documents FR-2,605,241, FR-2,636,857, FR-2,734,083. The acid compounds $CO_2$ and $H_2S$ are discharged through line 2. Part of the mercaptans, notably the methylmercaptan, is partly removed from the gas during this treatment. These mercaptans are also discharged through line 2. The $H_2S$ content is of the order of 4 ppm by mole, the $CO_2$ content is below 2% by mole.

The deacidized gas can then be treated by means of a glycol dehydration method, for example described by document FR-2,740,468. The glycol used can be triethylene glycol (TEG). At the outlet of this unit, a dehydrated gas whose residual water content can be of the order of 60 ppm by mole is obtained. This gas still contains mercaptans and heavy hydrocarbons. The water is discharged through line 4.

The treated gas flowing from unit 30 through line 5 is depleted in water and in acid compounds $CO_2$ and $H_2S$, but it still contains mercaptans, in proportions that can be greater than 200 ppm by mole in sulfur equivalent.

2) Thorough Dehydration

The dehydrated and deacidized gas can be subjected to thorough dehydration by adsorption, for example, on molecular sieves. In connection with FIG. 2, the gas circulating in line 5 is fed into enclosure 36 comprising an adsorbent material. The dehydrated gas is discharged through line 37. A specific water adsorbent material such as, for example, a type 3A and/or 4A molecular sieve can be preferably selected in this case. The adsorbent material is preferably placed in a specific enclosure different from enclosures 31 and 32 used for mercaptan removal. Regeneration of the adsorbent material contained in enclosure 36 is conventionally carried out by TSA, the purge gas being for example a fraction of the purified gas. The dehydration adsorbent material can also be placed in the same enclosure as that containing the adsorbent material used for mercaptan removal, i.e. enclosure 31. In this case, the purge gas, after displacement of the mercaptans, contains water.

3) Mercaptans Adsorption

The dehydrated and deacidized gas is then sent to a purification unit using adsorption on an adsorbent material, for example on molecular sieves, in order to remove the mercaptans still present in this gas. This unit comprises at least two enclosures 31 and 32 containing a suitable adsorbent material allowing notably adsorption of mercaptans such as methyl-, ethyl-, propyl-mercaptan, and the higher mercaptans. Enclosures 31 and 32 work alternately in adsorption and regeneration mode.

The dehydrated and deacidized gas circulating in line 5 (in connection with FIG. 1) or possibly circulating in line 37 (in connection with FIG. 2) is fed into enclosure 31. The mercaptans contained in the gas are adsorbed by the adsorbent material contained in enclosure 31. A purified gas meeting the requirements relative to acid gas, total sulfur and water is obtained at the outlet of enclosure 31. The purified gas is discharged from enclosure 31 through line 6.

The purified gas is obtained as long as the cycle time is less than the mercaptan breakthrough time, i.e. adsorption is carried out in enclosure 31 for example until the material is saturated with mercaptans. Enclosure 31 is then replaced by another enclosure, for example enclosure 32 whose adsorbent material is regenerated, i.e. it comprises no or few adsorbed mercaptans.

The temperature inside enclosure 31 generally ranges between −40° C. and 100° C., advantageously between 0° C. and 70° C., preferably between 20° C. and 60° C. The pressure in enclosure 31 can be the pressure of the natural gas produced, typically ranging between 2 MPa and 10 MPa.

According to the invention, the adsorbent materials contained in enclosures 31 and 32 are preferably selected from among the molecular sieves, also referred to as zeolites, activated charcoals, or activated alumina or silica gel type mesoporous adsorbents.

Among the zeolites, type A (LTA family), type X or Y (FAU faujasite family) or type MFI (ZSM-5 and silicalite) zeolites, whose pore size is compatible with the size of the mercaptans to be adsorbed, can be selected.

A partly calcium-exchanged 4A zeolite, whose Na/Ca exchange rate preferably ranges between 25% and 85% by mole, can be selected from among the A (LTA) family zeolites. It is possible to select, from the type X or Y (FAU faujasites) zeolites, a type 13X or NaX zeolite, but other exchange cations can also be used, alone or in admixture, such as for example Ca, Ba, Li, Sr, Mg, Rb, Cs, Cu, Ag . . . . The silicon/aluminium ratio can range between 1 and infinity, what is referred to as infinity is understood to be the dealuminized Y zeolites. The ZSM-5 zeolites whose Si/Al ratio ranges from 1 to infinity (silicalite in the latter case) can be selected from among the type MFI zeolites.

The other adsorbent materials that can be used can be selected from activated charcoals, preferably those having a BET specific surface area conventionally determined by physisorption of nitrogen at 77K, ranging between 200 and 2000 $m^2/g$, or from activated aluminas or silica gels, preferably those having a BET specific surface area ranging between 100 and 800 $m^2/g$.

The adsorbent materials are preferably used in fixed beds, for example in form of balls or of extruded material. They can be used either alone or in admixture, for example in multibed form.

4) Fractionation

The purified gas is then sent to fractionating unit 34 in order to separate the various cuts, for example by distillation. At the outlet of unit 34, methane (line 7), ethane (line 8), propane (line 9), butane (line 10) and a cut of heavy hydrocarbons containing more than five carbon atoms (line 11) are obtained for example.

5) Regeneration

The material contained in enclosure 32, working alternately with enclosure 31, is regenerated. According to the invention, a purge gas is used for desorption of the mercaptans adsorbed by the material contained in enclosure 32, the purge gas containing a displacement agent.

What is referred to as displacement agent is one or more hydrocarbon compounds, of heavy hydrocarbon (C5+), paraffin, naphthene or aromatic type. These compounds can be selected from among the hydrocarbon compounds of the C5+ fraction of the natural gas, saturated and/or aromatic. These compounds can also be benzene, toluene, xylene isomers, or aromatic compounds comprising a ring substituted by one or more methyl and/or ethyl groups. The agent can comprise one of the aforementioned compounds or a mixture of some of the aforementioned compounds.

The displacement agent contains at least one compound that can be adsorbed on the adsorbent material and having an affinity close to that of the mercaptans. For example, if a 5A zeolite is used, the displacement agent can preferably contain at least one normal paraffin. If a 13X zeolite is used, a mixture of saturated and/or aromatic hydrocarbon compounds can be used. Said aromatic compounds can belong to the BTX family.

The displacement agent can be obtained during the stage of condensation and fractionation of the natural gas in line 11, coming from fractionating unit 34. The displacement agent can also be fed, partly or entirely, through secondary line 12.

For example, the displacement agent fed through line 13 into contactor 33 can consist, on the one hand, of the C5+ hydrocarbons, preferably the C6+ cut, and advantageously of the fraction rich in BTX type aromatic compounds from fractionating unit 34 and, on the other hand, of makeup heavy hydrocarbon compounds, notably a C5+ cut, and preferably rich in BTX type aromatic compounds fed through line 12.

According to the invention, part of the methane making up the purified gas from enclosure 31 is used as purge gas. The purge gas flow rate can range between 1% and 50% of the flow rate of the feed gas flowing in through line 1, ranging for example between 1% and 20%, advantageously between 1% and 10%, preferably between 1% and 5%. For example, part of the gas coming directly from enclosure 31 and/or part of the light fraction of the gas (C1 and/or C2 cut) from fractionating unit 34 are sent respectively through lines 15 and 14 into gas/liquid contactor 33 to be laden with the displacement agent.

The pressure and temperature conditions in gas/liquid contactor 33 for lading the purge gas with displacement agent are preferably so selected that the relative pressure of the displacement agent in contactor 33 is less than 1, preferably less than 0.8 so as to limit the capillary condensation phenomenon in the adsorbent mesopores. The pressure in contactor 33 can range between 0.5 MPa and 10 MPa, preferably between 2 MPa and 8 MPa, more preferably between 3 MPa and 7 MPa. The temperature in contactor 33 can be selected at most equal to the displacement temperature in enclosure 32 in regeneration mode, and preferably lower, by some degrees, than the temperature used during the displacement stage, so that the relative pressure of the displacement agent in the purge gas is below 1. For example, the temperature in contactor 33 ranges between 0° C. and 150° C., preferably between 20° C. and 100° C., and advantageously between 30° C. and 80° C.

The gas from contactor 33, laden with a heavy hydrocarbon fraction, under the pressure, temperature and flow rate conditions of contactor 33, thus constitutes the purge gas, and it is sent through line 18 into enclosure 32 working in regeneration mode. Enclosure 32 can work at a pressure ranging between 1 MPa and 10 MPa, preferably between 2 MPa and 8 MPa, and at a temperature ranging between 0° C. and 150° C., preferably between 30° C. and 100° C.

The function of the displacement agent is to substitute, in the adsorbent material, for the adsorbed mercaptans, which are released and discharged with the purge gas through line 19. A purge gas containing a large amount of desorbed mercaptans, typically at a concentration that is 2 to 20 times as high as the mercaptan concentration in the gas to be treated and flowing in through line 1, is collected through line 19 at the outlet of enclosure 32.

In enclosure 32, the purge gas being free of mercaptans, an equilibrium is established between the adsorbed mercaptans and this gas, which leads to partial desorption of the adsorbed mercaptans in enclosure 32. Because of the nature of the adsorption isotherms of the mercaptans, a very large amount of gas would be necessary for significant desorption of the mercaptans at moderate temperature, between 0° C. and 150° C. The use of a displacement agent according to the invention has the advantage of favouring exchange between desorption of the mercaptans and adsorption of the displacement agent on the adsorbent material. At the outlet of enclosure 32, the purge gas is enriched in mercaptans and contains only a smaller amount of displacement agent. The amount of purge gas required for desorption of the mercaptans varies notably depending on the displacement agent content in the purge gas. A high displacement agent content allows to significantly reduce the amount of purge gas required for regeneration of the adsorbent material contained in enclosure 32. The relative affinity of the displacement agent towards the adsorbent material, in relation to that of the mercaptans, is also a parameter allowing to reduce the amount of purge gas to be used.

6) Treatment of the Mercaptan-Laden Purge Gas

The gas leaving enclosure 32 through line 19 is laden with mercaptans. This gas is treated in washing unit 35 in order to remove to the maximum the mercaptans, for example by washing with an alkaline soda or potash solution. The mercaptans are discharged through line 21. Then, the washed gas is sent back through line 20 with the raw natural gas to be treated. The washed gas may not be subjected to the deacidizing treatment and, possibly, the dehydration treatment carried out in treating unit 30. Thus, the washed gas is mixed with either the raw gas circulating in line 1, or with the deacidized raw gas obtained in unit 30, or with the deacidized and dehydrated raw gas circulating in line 5.

Figure 3:
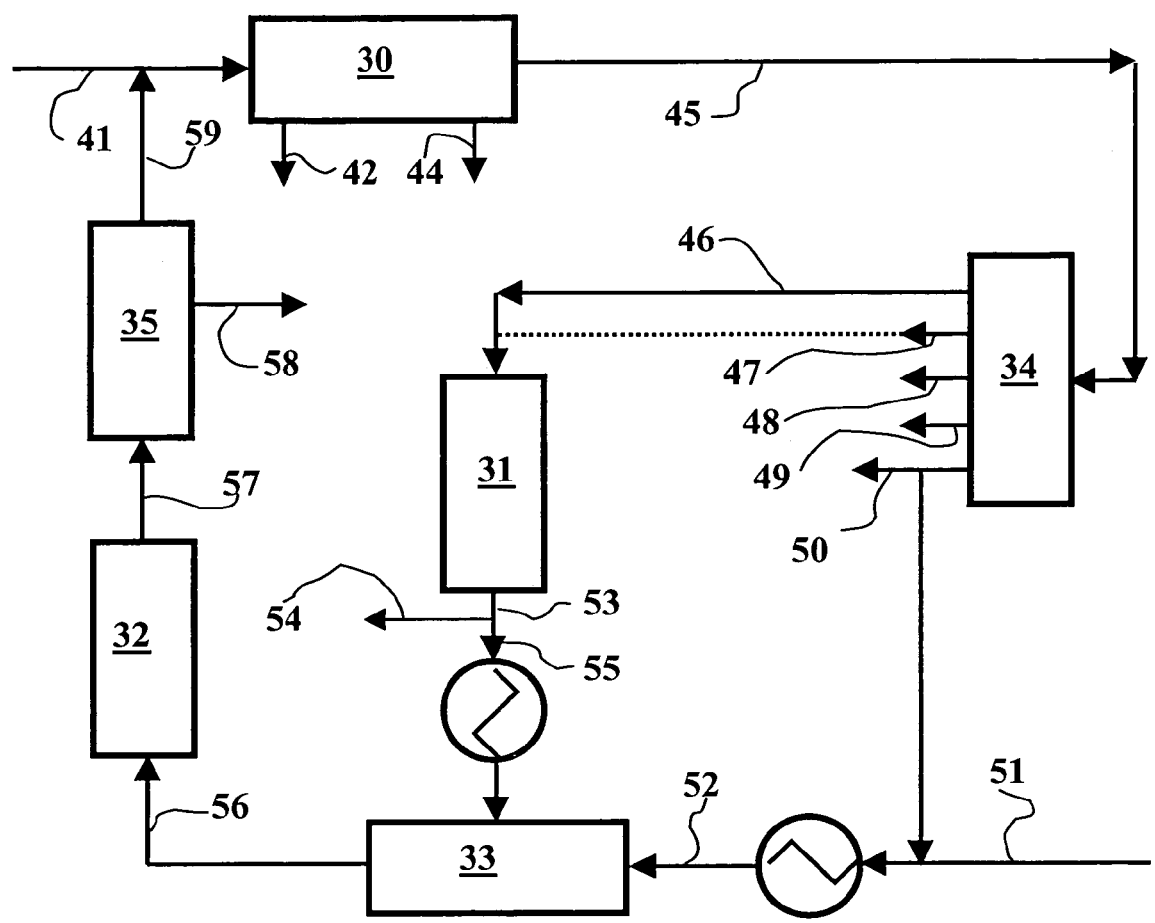

FIG. 3 shows another embodiment of the invention wherein the mercaptan adsorption enclosure is arranged after the unit for fractionating the gas into C1, C2 and/or C1+C2 cuts. In FIG. 3, the elements similar to those shown in FIG. 1 have the same reference numbers.

The natural gas to be treated flowing in through line 41 is fed into treating unit 30 to be dehydrated and deacidized. The acid compounds $H_2S$ and $CO_2$ are discharged through line 42 and the water is discharged through line 44. The treated gas flowing from unit 30 through line 45 is depleted in water and in acid compounds $H_2S$ and $CO_2$, but it still contains mercaptans, in a proportion that can be higher than 200 ppm by mole in sulfur equivalent.

The gas circulating in line 45 is fed into fractionating unit 34 in order to separate the various cuts. The methane is discharged through line 46, the ethane through line 47, the propane through line 48, the butane through line 49 and the hydrocarbons containing more than five carbon atoms are discharged through line 50.

The methane circulating in line 46 and possibly the ethane circulating in line 47 are fed into enclosure 31 containing a mercaptan-adsorbent material. The purified gas flows out of enclosure 31 through line 53. It contains mercaptans, acid compounds and water in a lower proportion than the amounts specified by the commercial requirements.

Part of the purified gas is discharged through line 54 to be marketed.

Another part of the purified gas is sent through line 55 to gas/liquid contactor 33 to be laden with displacement agent flowing in through line 52. The displacement agent is a heavy hydrocarbon containing at least five carbon atoms (C5+). The displacement agent can come from line 50 from the fractionating unit and/or it can be introduced through line 51.

The gas laden with displacement agent is fed through line 56 into enclosure 32 containing an adsorbent material in order to ensure desorption of the mercaptans.

The mercaptan-laden gas discharged through line 57 of enclosure 32 is fed into washing unit 35 in order to best remove the mercaptans. The mercaptans are discharged from washing unit 35 through line 58, the gas discharged through line 59 is recycled with the gas to be treated circulating in line 41. The washed gas circulating in line 59 may not be subjected to the deacidizing treatment and possibly to the dehydration treatment carried out in treating unit 30. Thus, the washed gas is mixed with either the raw gas circulating in line 41, or with the deacidized raw gas obtained in unit 30, or with the deacidized and dehydrated raw gas circulating in line 45.

Sweetening of the propane (line 48), butane (line 49) and/or heavy hydrocarbon (line 50) cuts can be carried out by means of an oxidation reduction treatment, for example the process known under the trade name Sulfrex. In this configuration, a unit intended for recovery of the displacement agent of the treated light cuts can be provided.

According to the methods described in connection with FIGS. 1, 2 and 3, enclosures 31 and 32 work alternately in adsorption mode (adsorption of the mercaptans contained in the gas to be treated), then in regeneration mode (desorption by means of the purge gas of the mercaptans trapped by the adsorbent material).

After a predetermined time, enclosures 31 and 32 are inverted. Inversion can be performed when the material contained in the enclosure working in regeneration mode is sufficiently regenerated to allow adsorption mode working. Inversion can also be performed when the material contained in the enclosure working in adsorption mode is too mercaptan-laden to be still able to provide purification of the gas to be treated.

Without departing from the scope of the invention, it is possible to adapt the method according to the invention to work with three or more than three enclosures containing an adsorbent material.

The invention claimed is:

1. A method of purifying a natural gas containing mercaptans, comprising the following stages:
    a) purifying said gas by contacting with a first amount of adsorbent material,
    b) mixing part of the purified gas obtained in stage a) with a liquid hydrocarbon phase comprising more than five carbon atoms,
    c) contacting the mixture obtained in stage b) with a second amount of adsorbent material laden with mercaptans.

2. A method as claimed in claim 1, wherein:
    stage a) is carried out at a pressure ranging between 2 MPa and 10 MPa, and at a temperature ranging between −40° C. and 100° C.,
    in stage b), said part of the purified gas makes up between 1% and 50% of said natural gas,
    stage b) is carried out at a pressure ranging between 0.5 MPa and 10 MPa, and at a temperature ranging between 0° C. and 150° C. so that the relative pressure of said hydrocarbons in said part of the purified gas is less than 1,
    stage c) is carried out at a pressure ranging between 1 MPa and 10 MPa, and at a temperature ranging between 0° C. and 150° C.

3. A method as claimed in claim 1, wherein after a predetermined time, in stage a), said natural gas is purified by contacting with the second amount of adsorbent material and, in stage c), the mixture obtained in stage b) is contacted with the first amount of adsorbent material.

4. A method as claimed in claim 1, wherein before stage a), the amounts of $CO_2$, $H_2S$ and water contained in the natural gas are reduced.

5. A method as claimed in claim 1, wherein the natural gas comprises hydrocarbons having at least five carbon atoms, wherein, before stage a), a fraction of said natural gas is separated, the fraction comprising hydrocarbons having at least five carbon atoms, and wherein said liquid phase of stage b) comprises said fraction.

6. A method as claimed in claim 1, wherein the natural gas comprises hydrocarbons having at least five carbon atoms and wherein a fraction of the purified gas obtained in stage a) is separated, the fraction comprising hydrocarbons having at least five carbon atoms, and wherein said liquid phase of stage b) comprises said fraction.

7. A method as claimed in claim 1, wherein before stage a), the natural gas is dehydrated by contacting the natural gas with a third amount of adsorbent material.

8. A method as claimed in claim 1, wherein the mercaptan-laden gas obtained in stage c) is washed with a mercaptan-absorbent solution, then the washed gas is recycled.

9. A method as claimed in claim 1, wherein the adsorbent material making up said first and second amounts comprises at least one of the following materials: a zeolite, an activated charcoal, an activated alumina type mesoporous adsorbent, and a silica gel type mesoporous adsorbent.

10. A method as claimed in claim 1, wherein the adsorbent material making up said first and second amounts comprises at least one of the following materials: a type A zeolite, a faujasite X type zeolite, a faujasite Y type zeolite, an activated charcoal having a BET specific surface area ranging between 200 $m^2/g$ and 2000 $m^2/g$, an activated alumina type mesoporous adsorbent having a BET specific surface area ranging between 100 $m^2/g$ and 800 $m^2/g$, and a silica gel type mesoporous adsorbent having a BET specific surface area ranging between 100 $m^2/g$ and 800 $m^2/g$.

11. A method as claimed in claim 1, wherein said hydrocarbons containing more than five carbon atoms comprise at least one of the following compounds: a saturated hydrocarbon, an aromatic hydrocarbon, a paraffin and a naphthene.

\* \* \* \* \*